Nov. 7, 1933.  F. L. TARLETON  1,934,606
CONTROL APPARATUS
Original Filed Oct. 6, 1931  3 Sheets-Sheet 1

WITNESSES:
James K. Mosser
W. M. Van Sciver

INVENTOR
FREDERIC L. TARLETON
BY
A. B. Reavis
ATTORNEY

Nov. 7, 1933.　　　F. L. TARLETON　　　1,934,606
CONTROL APPARATUS
Original Filed Oct. 6, 1931　　3 Sheets-Sheet 2

WITNESSES:
E. Lutz
W. M. Van Seiver

INVENTOR
FREDERIC L. TARLETON
BY
A. B. Reeves
ATTORNEY

Nov. 7, 1933.　　　F. L. TARLETON　　　1,934,606
CONTROL APPARATUS
Original Filed Oct. 6, 1931　　3 Sheets-Sheet 3
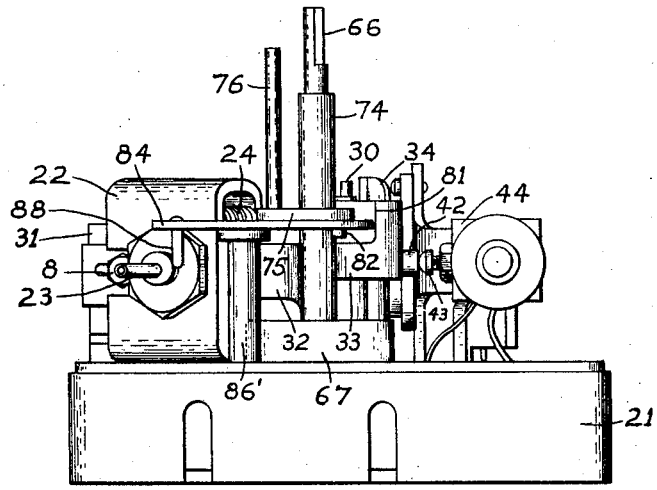
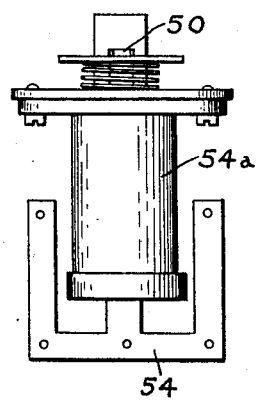
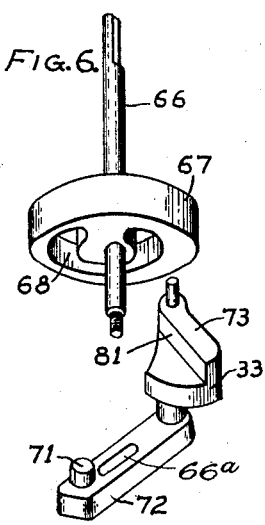
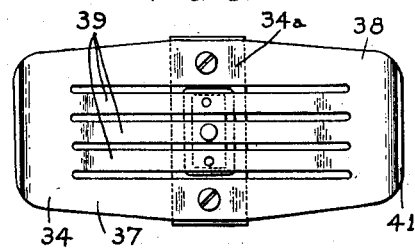
WITNESSES:
INVENTOR
FREDERIC L. TARLETO
BY
ATTORNEY Patented Nov. 7, 1933

1,934,606

UNITED STATES PATENT OFFICE 1,934,606

CONTROL APPARATUS

Frederic L. Tarleton, Greenville, Mich., assignor to Westinghouse Electric & Manufacturing Company, East Pittsburgh, Pa., a corporation of Pennsylvania Original application October 6, 1931, Serial No. 567,193. Divided and this application May 10, 1933. Serial No. 670,337

27 Claims. (Cl. 62—4)

The invention relates to refrigerating apparatus, and particularly to the control mechanism for such apparatus. This application is a division of my co-pending application S. N. 567,193 filed October 6, 1931, for Refrigeration apparatus.

In mechanical refrigerators of the compression type, the compressor on starting must overcome the pressure on the condensing side of the refrigerating system. In refrigerating apparatus of the type having a sealed casing for the motor and compressor a separate fan motor must be provided on the outside of the casing for cooling the condenser, since a shaft for a fan extending through the casing cannot be effectively sealed. To give the motor sufficient torque at starting and to also start the fan motor, two split phase motors having their starting and running winding in parallel are sometimes used. The starting windings are cut out when the motors come up to speed. It is advantageous to have the motor control switch and the mechanism for placing the starting windings in the motor circuit and for taking them out again mounted on the same panel for reasons of compactness and accessibility.

The starting switch for the motor of the refrigerator is made responsive to the temperature of the cooling unit or the refrigerator compartment or both, so that the machine will operate when the temperature rises to a predetermined point and will stop as soon as a predetermined low temperature is again reached. It is also desirable to provide a manually operable means for disconnecting the motor when the machine is not to be used for considerable periods of time as well as a means for permitting adjustment of the temperature responsive control to maintain temperatures other than those desired for normal operation, as for example when ice is to be quickly frozen, in which event a lower evaporator temperature is required, or when the cabinet is used less than the usual amount in which case the control may be set to maintain a higher average temperature than normally required.

It is also desirable for a refrigerator motor to be restored automatically to the control of the temperature responsive device after a manually-initiated defrosting cycle has ended. In other words, when a refrigerator has been shut off for defrosting and the temperature of the cooling unit or evaporator reaches a point somewhat above 32° F., so that the frost has melted, it should automatically be returned again to operation so that food contained in the cabinet will not spoil.

In accordance with my invention, I provide a member which is movable in response to cooling unit temperature together with a switch operated by the member to control cycling of the refrigerating system, means being interposed between the switch and the member operated in response to temperature so that both opening and closing movements of the switch may be advanced or retarded simultaneously with respect to movement of the temperature responsive member, whereby the refrigerator temperature may be raised or lowered merely by adjustment of the interposed operating means whereby the temperature differential between the "off" and "on" temperature for operating the switch is moved. The use of additional loading or biasing devices in connection with the temperature responsive member is avoided. A variation in timing is thereby obtained in the operation of the switch with respect to the movement of the temperature-responsive member. My improved controlling mechanism also includes features which are effective to prevent closure of the switch, to prevent opening of the switch, and to release the switch closure prevention means upon the attainment of a predetermined temperature higher than the normal operating range in order that normal operation of the refrigerator may be restored.

It is an object of the invention, therefore, to provide a control mechanism for a mechanical refrigerator which embodies within a relatively small space a means for starting and stopping the machine in response to temperature changes of the cabinet or cooling unit.

Another object of the invention is to provide means for varying the operation of temperature responsive means to change the temperature limits within which the machine operates.

A still further object of the invention is to provide a simple and effective means cooperating with the temperature responsive means for automatically restarting the compressor and restoring it to the control of the temperature responsive device at the completion of a manually initiated defrosting cycle.

Further objects and advantages of the invention will be apparent from the following description and accompanying drawings wherein:

Figure 5 is an end elevational view of the right end of the switch shown in Figure 3;

Figure 6 is an exploded perspective view showing constructional details of the temperature adjusting mechanism;

Figure 7 is a plan view of the electro-magnetic device for controlling the starting windings of the motors;

Figure 8 is a plan view of the main switch plate;

Figure 9 is a perspective view of the control dial and the rod leading to the control box.

Figure 1:
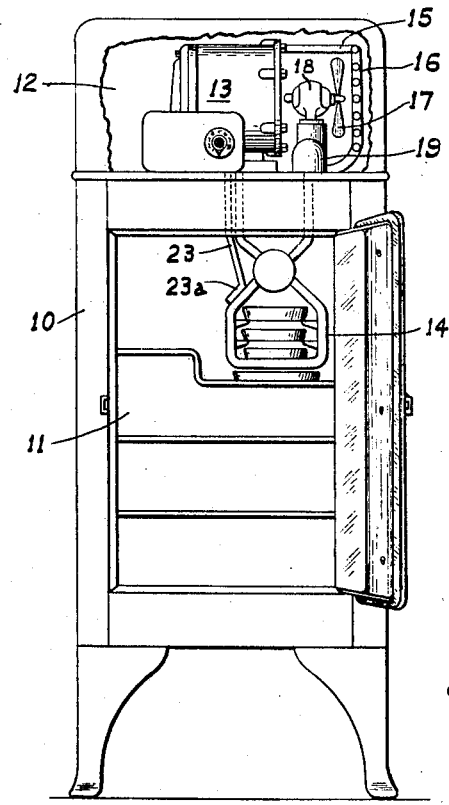
Figure 1 is a front elevational view of a refrigerator cabinet provided with control mechanism embodying the invention.
Figure 10:
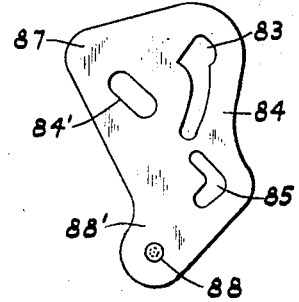
Figure 10 is a plan view of the defrosting plate.

Referring specifically to Fig. 1, 10 designates a refrigeration cabinet provided with a food compartment 11 and a machine compartment 12. A hermetically sealed motor compressor unit 13 is located in the compartment 12. Expanded refrigerant drawn from the evaporator 14 located in the food chamber 11 is compressed in the unit 13 and is forced through the conduit 15 into the condenser 16, where the gas is cooled and liquefied, assisted by a draft of air created by a fan 17 driven by a separate motor 18. The flow of condensed refrigerant from the condenser to the evaporator is controlled by a float valve mechanism 19. The operation of the motor compressor unit is controlled by a mechanism responsive to the temperature changes in the evaporator or the cooling chamber, or both.

Referring to Figs. 3 to 10 inclusive for a detailed description of the temperature responsive control, 21 designates a substantially rectangular base upon which the various control elements are mounted. This base is preferably made of an insulating material, such as a phenolic condensate product. Fastened to the base 21 is a frame 22 supporting a sylphon bellows 24. This bellows is connected with a conduit 23 leading to a bulb 23a (Fig. 1) placed adjacent the evaporator 14 or in the food compartment 11. The bellows, conduit and bulb are filled with an expansible gaseous medium such as sulphur dioxide or methyl chloride. The bellows 24 expands due to gas in the thermostatic bulb expanding, and will, therefore, tend to move one of its ends outwardly, as the other end is fixed to the frame 22 by the nuts 25 screwed on threads 26 on the conduit 23. Attached to the free end of the bellows 24 is a rod 27 which presses against one arm 28a of bell crank lever 28. This lever is pivoted on a pin 9 attached to the base 21.

Expansion of the bellows rotates the lever 28 in a clockwise direction. In opposition to the pressure of the bellows 24 is the biasing force exerted by a spring 29 pressing against the arm 28a and attached to the base by means of member 31 having the rod 8 provided with a stop 27a at one end thereof. The nuts 25 when moved vary the operating characteristics of the bellows 24 by compressing or allowing expansion thereof whereby the primary temperature range of the switch may be varied. The nut 26a may also be adjusted to vary the force of the spring 29 to adjust the primary temperature range. The bellows and the force exerted by the spring 29, together with the length of the rod 8 and the switch operating linkage, provide an adjustable primary temperature range within which the switch operates; in other words, these factors provide the locus of temperatures which the switch controls by providing a definite maximum and minimum possible operating temperature, which is set at the factory. The other arm 32 of the lever 28 bears on a generally wedge shaped piece of insulating material 33. This material 33 contacts with a switch plate 34, the details of which are shown in Fig. 8. The operation of this switch plate is fully disclosed in Patent No. 1,669,531, issued to August Mottlau, and a brief description of its operation will, therefore, suffice.

One end of the switch plate 34 is held in a fixed position by an L-shaped member 35 having an adjusting screw 36 which may be locked in place by a nut 36a. The other end 41 of the plate 34 is free to move but is in contact with a movable wedge-shaped piece 33. The switch plate 34 has a U-shaped depression 34a in the two outer strips 37 and 38, while the three inner bridge members 39 are slightly raised. This construction effects the depression of the bridge members 39 in the middle when the free end 41 of the plate 34 is raised. When it is lowered, the bridge members 39 will snap upward due to the inherent resiliency of the metal strips. A snap action is imparted to the bridge members 39 when the free end 41 of the plate 34 is either raised or lowered. This type of switch is commonly called a "grasshopper" switch. A contactor button 42 is attached to the bridge members 39 by any desired means and a coacting contactor button 43 is held by the protruding member 44 which is fastened to the base 21.

When the bellows 24 expands due to a rise in temperature in the cooling chamber or evaporator, the rod 27 moves the lever 28 clockwise as soon as the gas pressure in the bellows 24 overcomes the resisting pressure of the spring 29. The spring 29 is utilized to ensure the return of the lever 28 when the gas in the bellows 24 again contracts. Assuming the member 33 to be in a raised position, and the contactor 42, therefore, not engaging the contactor 43, since the bridge 39 is depressed, when the rod 27 moves the lever 28, the arm 32 is dropped, thus allowing the member 33 which is mounted pivotally on the base 21 by pin 30 to rotate in a clockwise direction about the pivot. This in turn allows the free end 41 of the switch plate 34 to drop, and the bridge portions 39 will, therefore, snap upwardly and contactors 42 and 43 will engage, thus closing the motor circuit. This is the position shown in Fig. 3.

When the gas in the thermostatic bulb contracts due to a lower temperature in the cooling unit 14, the bellows 24 contracts until the spring 29 rotates the lever 28 in a counter-clockwise direction, thus raising the arm 32 and the member 33, which pushes the end 41 of the switch plate 34 upwardly until the bridge 39 snaps downwardly and breaks the motor circuit through the contacts 42 and 43.

Figure 2:
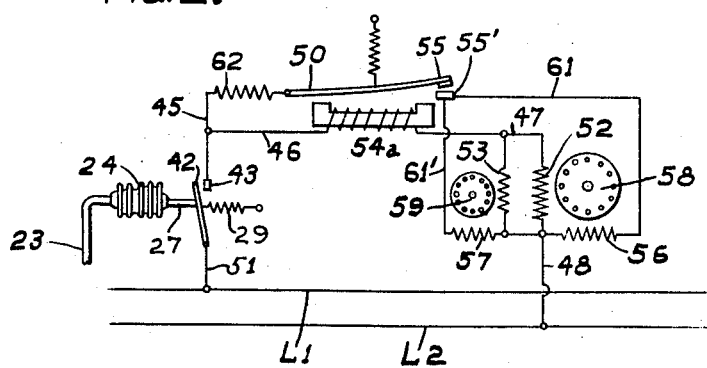
Figure 2 is a diagrammatic view illustrating the main control circuit for the compressor and fan motors of a mechanical refrigerating apparatus of the hermetically sealed type.

Referring to Fig. 2 the compressor and fan motors are shown having their starting and running windings connected in parallel, and controlled by a solenoid operated relay. A sylphon bellows responsive to temperature is shown to operate the main switch contacts 42 and 43. As soon as the motor circuit is closed by the contactors 42 and 43, current will pass from line conductor L1, through conductors 51, contacts 42, 43, conductor 46, coil 54a, conductor 47, main windings 52 and 53 which are connected in parallel and conductor 48 to line conductor L2. The initial surge of current through the running windings energizes the magnet coil 54a sufficiently to cause it to draw up the core 54 thereby closing the contacts 55 and 55'. The contact 55 is carried on the pivoted arm 50 which acts as a conductor. The starting windings 56 and 57 for the compressor motor 58 and the fan motor 59, respectively, which windings are connected in parallel, are supplied with current from line conductor L1 through conductor 51, contacts 42 and 43, conductor 45, resistor 62, arm 50, contacts 55 and 55', then through the two starting windings 56 and 57 which are connected in parallel by conductors 61 and 61', and from these windings through conductor 48 to line conductor L2.

As soon as the motors come up to speed the current drawn by the running windings 52 and 53 decreases, and magnetic flux in the coil 54a thereby is reduced until the core 54 drops downwardly, thus opening the contacts 55 and 55' and deenergizing the starting windings 56 and 57. The running windings remain energized and the motors will continue to operate until the contactors 42 and 43 are opened by the action of the temperature responsive switch 34. The general operation of the motor starting system is fully described in the patent of Matson C. Terry No. 1,814,013 for Refrigerators.

The foregoing description covers the operation of the motors and control for maintaining one set of temperature conditions in the cooling unit of a refrigerating apparatus. The invention contemplates in addition means for varying the temperature limits in the cooling compartment or evaporator to obtain different average temperatures. Means are also provided to permit turning the machine off permanently, and to permit a manually initiated defrosting cycle, at the conclusion of which the machine is automatically restored to the control of the temperature responsive device. However, the control mechanism is so constructed that these operations will take place in exactly the same manner after certain other operations have been performed regardless of the pre-setting of certain manually adjustable features.

As before stated, it is desirable to provide a means for varying the average temperature to be maintained, which when operated manually, will function to attain that temperature automatically and maintain the same average temperature until a different one is selected. The grasshopper switch 34, in conjunction with a simple mechanical means, is peculiarly adapted to controlling the average temperature of the cooling compartment as desired. A dial 63 as shown in Fig. 9 marked with numbers or letters or both, is provided for the user. This dial is provided with a knob 64 and a pointer 65 mounted on the rod 66, so that by turning the knob 64 the rod 66 is also turned. The temperature setting knob 64 and indicator dial 63 are disposed at a readily accessible part of the apparatus, extending through the front wall of the machinery compartment 12.

Adjustment of the operating position of the switch 34 to obtain different average evaporator temperatures is obtained by raising or lowering the free end of this switch by means of the wedge shaped piece 33. In order to accomplish this result it is necessary to move the piece 33 horizontally. One means for obtaining this movement is as follows: When the knob 64 is rotated, the rod 66 connected to a roller 67, shown in detail in Fig. 6, is also rotated, thereby rotating the roller 67. In the roller 67 is an eccentric groove 68 which engages a pin 71 formed integral with an arm 72. The shaft 66 extends through a slot 66a in arm 72. The arm 72 is pivotally attached to the wedge-shaped member 33 and when the roller 67 is rotated, the pin 71 is moved forward and backward by the eccentric groove 68, thus moving the member 33 forward or backward. Since an angular surface 73 of the member 33 supports the end 41 of the grasshopper switch 34, the end 41 will be raised or lowered as the member 33 slides toward or away from it. The positioning of the wedge from one horizontal extremity to the other provides for a normal operating temperature range contained within the primary temperature range provided by the spring 29 and the bellows 24.

Assuming the contact members 42 and 43 to be opened and the wedge-shaped piece 33 to be moved so that the free end 41 of the grasshopper switch 34 is in its lowest position. A relatively slight expansion of the bellows 24 in response to an increase in the evaporator temperature will rotate the bell crank lever 28 clockwise an amount sufficient to cause the arm 32 to release the wedge-shaped member 33 which in turn moves clockwise, whereupon the inherent resiliency of the grasshopper switch causes the contacts 42 and 43 to engage and permit the motors to start. The compressor operates until the evaporator temperature has been reduced sufficiently to allow the spring 29 to overcome the pressure within the bellows and rotate the bell-crank 28 counter-clockwise, far enough to raise the end 41 to the point at which the inherent resiliency of the grasshopper switch causes the contacts 42 and 43 to separate with a snap action. When the wedge member is in the position just described, that is outwardly, the lowest evaporator temperatures are produced because of the relatively slight amount the bellows 24 must expand to cause the switch contacts to close.

Figure 3:
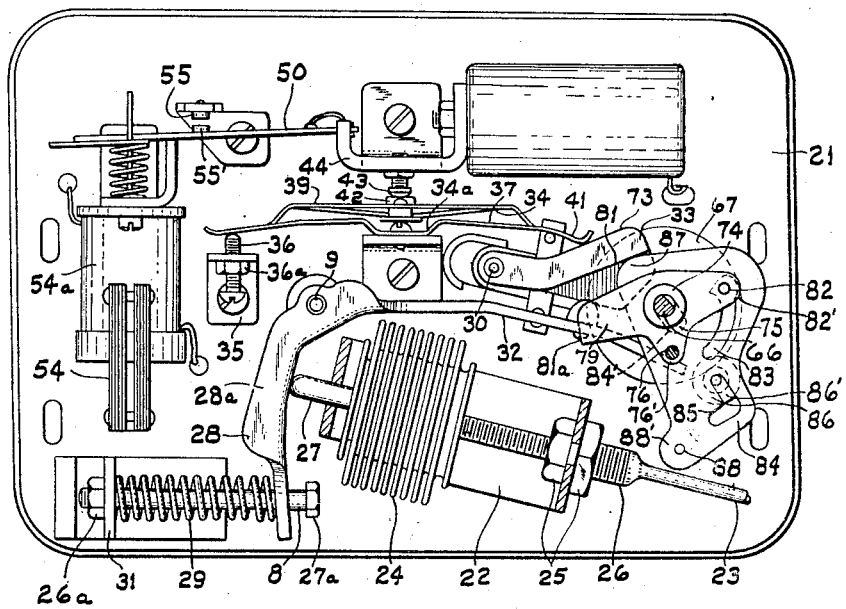
Figure 3 is a plan view of the control mechanism with the main switch closed.
Figure 4:
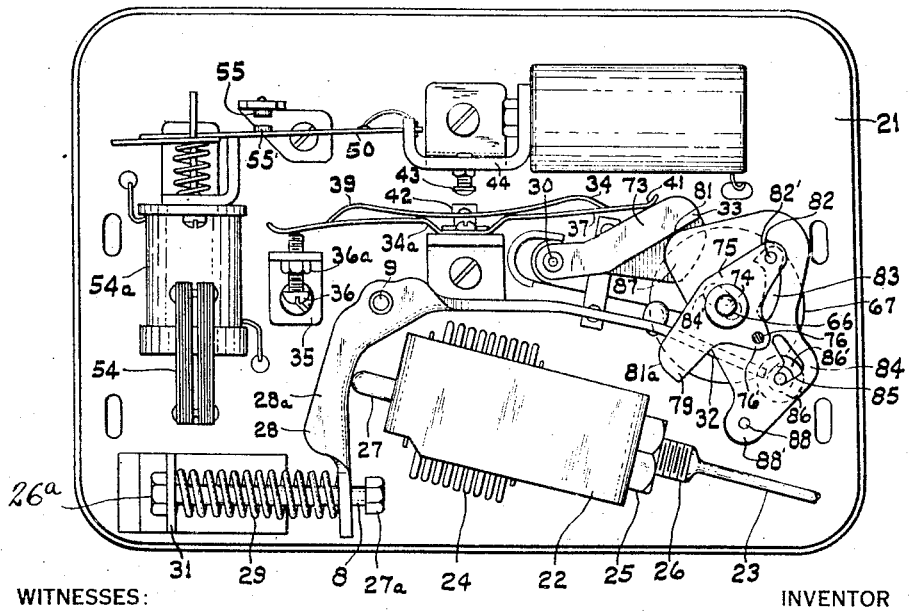
Figure 4 is a view similar to Figure 3 but showing the mechanism in the defrosting position.

The upper contact 43, as shown in Figs. 3 and 4, has a threaded connection with respect to the supporting bar 44, this connection providing for upward and downward adjustment of the upper contact so as to secure variation in the extent of angular movement of the switch operating portion of the grasshopper member between closed and opened positions of the switch contacts and therefore variation in the temperature differential between opening and closing positions of the switch.

The stop 27a, provided by the head of the bolt 8, is so positioned that when the indicator knob 64 is turned to the number 1 position on the dial 63, the wedge 33 will be at its outward extremity and the arm 28a will be engaged by the stop 27a before the arm 32 of the bell crank lever 28 has rotated counter-clockwise far enough to raise the wedge and the end of the switch plate. The machine will, therefore, run constantly regardless of the evaporator temperature and will continue to do so until the wedge is set to correspond to number 2 or a higher dial setting. Thereby "quick freezing" is obtained.

The number 2 position of the indicator is the first one that will allow the machine to run intermittently in response to the evaporator temperature as the grasshopper switch 34 will be opened before the arm 28 reaches the stop 27a.

As the wedge member 33 is moved inwardly by rotating the knob 64 and shaft 66 counter-clockwise the free end 41 of the grasshopper switch is progressively raised. As a result of this action the bellows 24 need not contract as far as when the wedge is in its outermost position, in order to permit the lever arm 32 to raise the free end of the grasshopper switch so as to cause separation of the contacts 42 and 43. It will be seen that by raising and lowering the wedge member 33, the temperature differential is raised and lowered since the temperatures at which the switch 34 opens and closes are raised and lowered simultaneously due to the variation of the range of movement of the switch end 41 with respect to the bell crank lever 28.

It is apparent, however, that the bell-crank lever 28 is merely a transmission device for translating the motion of the bellows 24 to a switch operating or actuating member, for example switch end 41, and that various other transmitting means may be employed. The essential features of the control are a switch operating member, such as the switch end 41, which opens and closes the switch 34 in response to expansion and contraction of a temperature-responsive means, for example, the bellows 24 through suitable transmission mechanism, and a variable spacing means, such as wedge member 33 coacts with the switch operating member, to vary the angular position thereof with respect to the transmission device, whereby the established temperature differential is moved up or down as an entirety with little or no effect upon the characteristic action of the biasing means, such as spring 29.

It is sometimes desirable or necessary to entirely shut off the machine so that it will not operate under any condition. According to this invention the grasshopper switch 34 is maintained in circuit breaking position by locking the free end 41 of the grasshopper switch 34 in a raised position, thus keeping the bridge 39 in a depressed state. The member 33 is supported in such a manner that the dropping of the arm 32 when the bellows 24 expands will not permit the grasshopper switch 34 or member 33 to drop. It is obvious that the motors will, therefore, not be energized.

To hold the member 33 permanently in a raised position, the wing portion 79 of a cam member 75 is rotated in a clockwise direction until it presses against the under surface 81 of member 33 and is held permanently in position by the following means:

The cam member 75 is provided with an extending wing 79. A hollow shaft 74 extends at right angles to the approximate center of the cam member. This shaft is mounted on and rotates about the temperature-selector shaft 66. The cam is rotated by a rod 76 extending parallel to the shaft 74 and rigidly fastened to a depending portion 76' of the cam member 75.

When it is desired to disconnect the motors from the main circuit, the rod 76 is moved in a clockwise direction by the handle 80 which is mounted on an extension 80a of a disc 80b. The disc 80b rotates freely on the shaft 66 between the temperature selector knob 64 and the indicator plate 63.

The movement of the rod 76 causes the cam member to likewise rotate in a clockwise direction, whereupon the flat end 81a of wing 79 contacts the under surface 81 of the wedge member 33 and raises this member which in turn elevates the free end 41 of the grasshopper switch 34 a distance sufficient to cause the contacts 42 and 43 to separate. As the wedge member is locked in the raised position by the cam member 75, it is unaffected by the expansion of the bellows 24 and consequently the contacts 42 and 43 will remain separated until the rod 76 is moved counter-clockwise to restore the device to the control of the temperature-responsive device.

It is necessary to periodically suspend the operation of the refrigerating apparatus long enough to permit melting of the accumulated frost on the cooling unit. Heretofore, it has been necessary to manually stop and start the machine for the defrosting period. The present invention includes a means as hereafter described, to automatically restart the compressor and restore the apparatus to the control of the temperature responsive device when the frost has melted from the evaporator, thereby relieving the user of the necessity of watching the apparatus, after the defrosting cycle has started, to manually restart the machine before an unsafe temperature prevails in the food chamber.

This is accomplished in the present invention, by providing an irregular shaped plate 84 (Fig. 10), mounted on the shaft 66 by a slot 84' so as to be capable of moving transversely as well as rotating about the shaft.

The movement of the plate 84 is directed by a pin 86 projecting from the outer end of a rod 86' rigidly fastened at its opposite end to the base 21. The pin 86 projects through an L-shaped slot 85 formed in the plate 84.

When the pin 86 and slot 85 are in the relative positions shown in Fig. 3, the defrosting plate 84 is inoperative and performs no function.

Fig. 4 shows the device in the defrosting position with the pin 86 in the lower end of the slot 85. This position is obtained by swinging the handle 80 counter-clockwise from its central position shown in Fig. 9 to the defrosting position D. The handle 80 rotates the cam member 75 counter-clockwise, whereupon a pin 82 mounted on a wing portion 82' of the cam member, and which slides freely in an additional slot 83 formed in the plate 84, engages the upper end of this slot and bodily moves the plate counter-clockwise about the shaft 66 and upwardly to the left. The extent of this position is limited by the pin 86 engaging the lower end of the slot 85.

The portion 87 of the plate 84 thereupon engages the under surface 81 of the wedge member 33 and raises the wedge and the free end 41 of the grasshopper switch 34 a distance sufficient to cause the contacts 42 and 43 to separate. The complete defrosting position is shown in Fig. 4. The handle 80 remains at the position D.

As the machine is now shut off the bellows 24 will expand in response to the increased evaporator temperature, but the switch contacts will not close when the normal temperature of from 15° to 28° Fahrenheit is reached, due to the fact that the wedge member, and consequently the free end of the grasshopper switch are mechanically locked in the raised position of Fig. 4. The bellows will, however, continue to expand in response to the increased evaporator temperature until, when a temperature corresponding to that at which all the frost will have melted from the cooling coils, and which may be approximately 40° is reached, the bell-crank lever 28 will have been rotated in a clockwise direction far enough to cause the end of arm 32 to engage an inwardly projecting pin 88 mounted on the lower lobe 88' of the plate 84 with a force sufficient to throw the plate back to the inoperative position shown in Fig. 3, and also move the handle 80 back to the off position, whereby the condition of the apparatus may be readily ascertained. This action releases the wedge member 33 and the free end of the grasshopper switch so that the contacts 42 and 43 immediately close and cause the compressor to operate. The apparatus then proceeds to function normally under the control of the temperature responsive apparatus.

It is a feature of the invention that both the off position and the defrosting position may be obtained regardless of the setting of the temperature selector and likewise the temperature selector may be readily adjusted while the apparatus is in either of these positions so as to cause the machine to operate between different temperature limits after the apparatus is restored to the control of the temperature-responsive device. It is another feature of the invention that after the defrosting position has been selected manually, the apparatus may be readily returned manually to the control of the temperature-responsive device. This enables the user to readily stop defrosting if the occasion arises that ice cubes or a lowered temperature in the cooling compartment of the refrigerator are desired after the defrosting cycle has been initiated but before it is completed.

It will readily be seen that I have invented a control unit for a mechanical refrigerator which is compact, and which will maintain predetermined temperature limits in the refrigerator compartment or evaporator, which temperature limits may be varied manually. I have also provided simple and accessible means for shutting off the refrigerating apparatus either permanently or for defrosting, and also means for automatically returning the refrigerating apparatus to normal operation after a defrosting cycle is completed, the means for accomplishing these results cooperating one with the other. No extra springs or switches are necessary to perform these functions other than those used for maintaining the temperature of the refrigerator at a predetermined degree. The means for controlling the starting windings of the refrigerator motors is also part of the control and is placed in the control box where it is easily accessible.

Although I have shown and described a specific embodiment of the invention, it is understood that those skilled in the art may make modifications and changes without departing from the spirit and scope of the appended claims.

What I claim is:—

1. In refrigerating apparatus, a cooling unit, means for circulating a refrigerant through the cooling unit, a device for controlling the operation of the circulating means including a switch, means associated with the switch for providing an established average temperature at which the cooling unit operates including a movable temperature responsive means for operating the switch, means for temporarily requiring an abnormal movement of the temperature responsive means in a switch closing direction to operate the switch to provide for defrosting of the cooling unit, and means for automatically restoring the temperature responsive means to normal operation after defrosting is effected, whereby normal movement only of the temperature responsive means is required to operate the switch.

2. In refrigerating apparatus, a cooling unit, means for circulating a refrigerant through the cooling unit, a device for controlling the operation of the circulating means including a switch, means associated with the switch for providing an established average temperature at which the cooling unit operates including a movable temperature responsive means for operating the switch, and means for temporarily requiring an abnormal movement of the temperature responsive means to operate the switch to provide for defrosting of the cooling unit and for automatically restoring the temperature responsive means to normal operation after defrosting is effected, whereby normal movement only of the temperature responsive means is required to operate the switch, said means for temporarily requiring an abnormal movement of the temperature responsive means including a movable cam member and means cooperating with the cam member for automatically restoring it to an ineffective position when defrosting is effected.

3. In refrigerating apparatus, a cooling unit, means for circulating a refrigerant through the cooling unit, a device for controlling the operation of the circulating means including a switch, means associated with the switch for providing an established temperature differential at which the cooling unit operates, means readily accessible in normal use for moving the temperature differential, whereby a normal cooling unit temperature range is established, means providing a primary temperature range within which the normal range is contained, and manually initiated means for modifying the operation of the switch to obtain a defrosting temperature in the cooling unit and for automatically restoring the operation of the switch to a condition to maintain the cooling unit at temperatures within the normal range at the time when the defrosting operation is substantially completed.

4. In refrigerating apparatus, a cooling unit, means for circulating a refrigerant through the cooling unit, a device for controlling the operation of the circulating means including switch means, means associated with the switch means for providing an established temperature differential at which the cooling unit operates, means readily accessible in normal use for moving the temperature differential, whereby a normal cooling unit temperature range is established, means providing a primary temperature range within which the normal range is contained, and manually initiated means for modifying the operation of the switch means to obtain a defrosting temperature in the cooling unit and for automatically restoring the operation of the switch means to a condition to maintain the cooling unit at temperatures within the normal range after the defrosting operation is completed, said readily accessible adjustable means being capable of all its provided adjustments at all times including the time when the manually initiated means is operated to effect defrosting of the cooling unit.

5. In refrigerating apparatus, a cooling unit, means for circulating a refrigerant through the cooling unit, a device for controlling the operation of the circulating means including switch means, means associated with the switch means for providing an established temperature differential at which the cooling unit operates, means readily accessible in normal use for moving the temperature differential, whereby a normal cooling unit temperature range is established, means providing a primary temperature range within which the normal range is contained, and manually initiated means for modifying the operation of the switch means to obtain a defrosting temperature in the cooling unit and for automatically restoring the operation of the switch means to a condition to maintain the cooling unit at temperatures within the normal range at the time when the defrosting operation is substantially completed, said manually initiated means being so arranged that the maximum defrosting temperature remains at substantially a fixed value regardless of the adjustment of the temperature differential.

6. In refrigerating apparatus, a cooling unit, means for circulating a refrigerant through the cooling unit, a device for controlling the operation of the circulating means including a switch, means associated with the switch for providing an established temperature differential at which the cooling unit operates, manually movable means readily accessible in normal use for moving the temperature differential, whereby a normal cooling unit temperature range is established, means providing a primary temperature range within which the normal range is contained, and manually initiated means for modifying the operation of the switch to obtain a defrosting temperature in the cooling unit and for automatically restoring the operation of the switch to a condition to maintain the cooling unit at temperatures within the normal range at the time when the defrosting operation is substantially completed.

7. In refrigerating apparatus, a cooling unit, means for circulating a refrigerant through the cooling unit, a device for controlling the operation of the circulating means including switch means, means associated with the switch means for providing an established temperature differential at which the cooling unit operates, manually movable means readily accessible in normal use for moving the temperature differential, whereby a normal cooling unit temperature range is established, means providing a primary temperature range within which the normal range is contained, and manually initiated means for modifying the operation of the switch means to obtain a defrosting temperature in the cooling unit and for automatically restoring the operation of the switch means to a condition to maintain the cooling unit at temperatures within the normal range at the time when the defrosting operation is substantially completed, said manually movable means and said manually initiated defrosting means being independently adjustable.

8. In refrigerating apparatus, a cooling unit, means for circulating a refrigerant through the cooling unit, a device for controlling the operation of the circulating means including switch means, means associated with the switch means for providing an established temperature differential at which the cooling unit operates, manually movable means readily accessible in normal use for moving the temperature differential whereby a normal cooling unit temperature range is established, means providing a primary temperature range within which the normal range is contained, manually initiated means including a manually positionable member for modifying the operation of the switch means to obtain a defrosting temperature in the cooling unit, and means for automatically restoring the operation of the switch means to a condition to maintain the cooling unit at temperatures within the normal range at the time when the defrosting operation is substantially completed and for automatically moving the manually positionable member to a position corresponding to non-defrosting operation of the switch at the time when the defrosting operation is substantially completed.

9. In refrigerating apparatus, a cooling unit, means for circulating a refrigerant through the cooling unit, a device for controlling the operation of the circulating means including switch means, means associated with the switch means for providing an established temperature differential at which the cooling unit operates, manually movable means readily accessible in normal use for moving the temperature differential whereby a normal cooling unit temperature range is established, means providing a primary temperature range within which the normal range is contained, manually initiated means including a manually positionable member for modifying the operation of said switch means to obtain a defrosting temperature in the cooling unit, means for automatically restoring the operation of said switch means to a condition to maintain the cooling unit at temperatures within the normal range at the time when the defrosting operation is substantially completed and for automatically moving the manually positionable member to a position corresponding to non-defrosting operation of said switch means after the defrosting operation is completed, and an indicator associated with the manually positionable member, whereby the condition of the switch means is indicated by the position of said last member with respect to the indicator.

10. In refrigerating apparatus, a cooling unit, means for circulating a refrigerant through the cooling unit, a device for controlling the operation of the circulating means including switch means, whereby a normal cooling unit temperature range is established, manually initiated means including a manually positionable member for modifying the operation of said switch means to obtain a defrosting temperature in the cooling unit, means for automatically restoring the operation of said switch means to a condition to maintain the cooling unit at temperatures within the normal range at the time when the defrosting operation is substantially completed and for automatically moving the manually positionable member to a position corresponding to non-defrosting operation of said switch means, and an indicator associated with the manually positionable member, whereby the condition of the switch means is indicated by the position of said last member with respect to the indicator.

11. In refrigerating apparatus, a cooling unit, means for circulating a refrigerant through the cooling unit, a device for controlling the operation of the circulating means including switch means, means associated with the switch means for providing an established temperature differential at which the cooling unit operates, manually movable means readily accessible in normal use for moving the temperature differential, whereby a normal cooling unit temperature range is established, means providing a primary temperature range within which the normal range is contained, manually initiated means including a manually positionable member for modifying the operation of said switch means to obtain a defrosting temperature in the cooling unit, and means for automatically restoring the operation of said switch means to a condition to maintain the cooling unit at temperatures within the normal range at the time when the defrosting operation is substantially completed and for automatically moving the manually positionable member to a position corresponding to non-defrosting operation of said switch means, said manually positionable member being readily movable to a position to effect non-defrosting operation of said switch means at any time after the defrosting operation is initiated but before it is completed.

12. In refrigerating apparatus, a cooling unit, means for circulating a refrigerant through the cooling unit, a device for controlling the operation of the circulating means including switch means, whereby a normal cooling unit temperature range is established, manually initiated means including a manually positionable member for modifying the operation of said switch means to obtain a defrosting temperature in the cooling unit, and means for automatically restoring the operation of said switch means to a condition to maintain the cooling unit at temperatures within the normal range at the time when the defrosting operation is substantially completed and for automatically moving the manually positionable member to a position corresponding to non-defrosting operation of said switch means, said manually positionable member being readily movable to a position to effect non-defrosting operation of said switch means at any time after the defrosting operation is initiated but before it is completed.

13. In refrigerating apparatus, a cooling unit, means for circulating a refrigerant through the cooling unit, a device for controlling the operation of the circulating means including switch means, means associated with said switch means for providing an established temperature differential at which the cooling unit operates, manually movable means readily accessible in normal use for moving the temperature differential whereby a normal cooling unit temperature range is established, means providing a primary temperature range within which the normal range is contained, manually initiated means including a manually positionable member for modifying the operation of said switch means to obtain a defrosting temperature in the cooling unit, means for automatically restoring the operation of said switch means to a condition to maintain the cooling unit at temperatures within the normal range at the time when the defrosting operation is substantially completed and for automatically moving the manually positionable member to a position corresponding to non-defrosting operation of the switch means, and an indicator associated with the manually positionable member whereby the condition of the switch means is indicated by the position of said last member with respect to the indicator, said manual means for moving the temperature differential being also associated with said indicator, to indicate the setting of the last-named means.

14. In refrigerating apparatus, a cooling unit, means for circulating a refrigerant through the cooling unit, a device for controlling the operation of the circulating means including a switch, means associated with the switch for providing an established temperature differential at which the cooling unit operates, means readily accessible in normal use for moving the temperature differential whereby a normal cooling unit temperature range is established, means providing a primary temperature range in which the normal range is contained, manually initiated means for modifying the operation of the switch to obtain an abnormal temperature in the cooling unit, and means for automatically restoring the operation of the switch to a condition to maintain the cooling unit at temperatures within the normal range at the time when the abnormal temperature has been substantially obtained.

15. The combination with refrigerating apparatus having a cooling unit and means for circulating refrigerant through the unit, of a device for controlling the circulating means to obtain normal refrigerating and defrosting temperature conditions and including a switch, a member having a range of movement; biasing means for moving the member in one direction; temperature responsive means for moving the member in the other direction against the force of the biasing means; mechanism utilizing an increment of movement of said member to open and close the switch and including means for shifting the operating increment with respect to the range; and means manually operated to supersede said mechanism to hold the contacts open and automatically rendered ineffective by said member moving a predetermined distance in response to increasing cooling unit temperature.

16. The combination with refrigerating apparatus having a cooling unit and means for circulating refrigerant through the cooling unit, of a device for controlling the circulating means to obtain normal refrigerating and defrosting temperature conditions and including a switch, a member having a range of movement, biasing means for moving the member in one direction, temperature responsive means for moving the member in the other direction against the force of the biasing means, a second switch operating member, mechanism utilizing an increment of movement of said first member to move the switch operating member to open and close the switch, variable spacing means disposed between the members for shifting the operating increment with respect to the range, and manually operable means to move the switch operating member to supersede said mechanism to hold the contacts open and automatically rendered ineffective by said member moving a predetermined distance in response to increasing cooling unit temperature.

17. The combination with refrigerating apparatus having a cooling unit and means for circulating refrigerant through the cooling unit, of a device for controlling the circulating means to obtain normal refrigerating and defrosting temperature conditions and including a switch, a member having a range of movement, biasing means for moving the member in one direction, temperature responsive means for moving the member in the other direction against the force of the biasing means, a second switch operating member, mechanism utilizing an increment of movement of said first member to move the switch operating member to open and close the switch, variable spacing means disposed between the members for shifting the operating increment with respect to the range, and manually operable means to move the switch operating member to supersede said mechanism to hold the contacts open and automatically rendered ineffective by said member moving a predetermined distance in response to increasing cooling unit temperature.

18. In a control mechanism for a refrigerating machine having an evaporator, a cyclically operated control member movable in response to changes in temperature, switch means operated by movement of the cyclically operated member for starting and stopping the refrigerating machine, means for varying the temperatures at which the movable member operates the switch means within a range sufficiently low in temperature to accumulate frost on the evaporator of the refrigerator, means for further varying the operation of the switch means relative to the movable member so as to secure a relatively higher temperature or defrosting period of the refrigerating machine during which the temperature is maintained sufficiently low to preserve food stuffs and sufficiently high to deter the accumulation of frost on the evaporator, manually controlled means for rendering said defrosting means effective, and means associated with said manually controlled means for adjusting said temperature varying means.

19. In a control mechanism for a refrigerating machine having an evaporator, the combination of switch means for starting and stopping the refrigerating machine, means responsive to temperature for actuating the switch means, means for varying the action of the switch means relative to the temperature responsive means so as to obtain various normal refrigerating temperatures at which frost accumulates on the evaporator and for interrupting the normal action of the switch means so as to obtain a predetermined abnormal temperature, means actuated by said temperature responsive means for actuating the switch means to start the refrigerating machine upon the attainment of said predetermined abnormal temperature, said abnormal temperature being sufficiently high to melt frost from the evaporator and sufficiently low to prevent food spoilage, and readily accessible control means carried by a single supporting structure for adjusting said varying means.

20. In a control mechanism for a refrigerating machine having an evaporator, the combination with switch means for starting and stopping the refrigerating machine, means responsive to temperature for actuating the switch means, first adjustable means for varying the action of the switch means relative to the temperature responsive means so as to obtain various normal refrigerator temperatures at which frost accumulates on the evaporator, second adjustable means for interrupting the normal action for the switch means so as to obtain a predetermined abnormal temperature, means actuated by the temperature responsive means for actuating the switch means to start the refrigerating machine upon the attainment of said predetermined abnormal temperature, said abnormal temperature being sufficiently high to melt frost from the evaporator and sufficiently low to prevent food spoilage, readily accessible, manual control means for rendering said second adjustable means effective, and readily accessible, manual control means associated with the last mentioned means for adjusting said first adjustable means.

21. In a control mechanism for a refrigerating machine having an evaporator, the combination with a single switch for starting and stopping the refrigerating machine, means responsive to temperature for actuating the switch, movable means for varying the action of the switch relative to the temperature responsive means so as to obtain various normal refrigerating temperatures at which frost accumulates on the evaporator and for interrupting the normal action of the switch so as to obtain a predetermined abnormal temperature, means actuated by said temperature responsive means for actuating said switch to automatically start the refrigerating machine upon the attainment of said predetermined abnormal temperature, said abnormal temperature being sufficiently high to melt frost from the evaporator and sufficiently low to prevent food spoilage, and readily accessible control means for adjusting said movable means.

22. In a control mechanism for a refrigerating machine having an evaporator, the combination of switch means for periodically starting and stopping the refrigerating machine, means responsive to a condition of the evaporator for actuating the switch means, movable means for varying the switch actuating means relative to the temperature responsive means so as to maintain various normal refrigerating temperature periods, during which frost accumulates on the evaporator, and for obtaining a temporary period of abnormal temperature, said abnormal temperature being sufficiently high to melt frost from the evaporator and sufficiently low to preserve foodstuffs, and readily accessible means for adjusting the movable means so as to obtain any normal temperature period or the abnormal temperature period, said readily accessible means being capable of ready adjustment to any normal temperature period setting at any time after initiation of the abnormal period without curtailing the latter, whereby a normal temperature period is effected after completion of the abnormal period.

23. In a refrigerating apparatus, a cooling unit, means for circulating refrigerant through the cooling unit, a device for controlling the operation of the circulating means including a switch, means associated with the switch for providing an established temperature differential at which the cooling unit operates, means readily accessible in normal use for moving the temperature differential, whereby a normal cooling unit temperature range is established, means providing a primary temperature range within which the normal range is contained, and means for modifying the operation of the switch to obtain a defrosting temperature in the cooling unit and for automatically restoring the operation of the switch to a condition to maintain the cooling unit at temperatures within the normal range at the time when the defrosting operation is substantially completed.

24. In a refrigerating apparatus, a cooling unit, means for circulating refrigerant through the cooling unit, a device for controlling the operation of the circulating means including switch means, means associated with the switch means for providing an established temperature differential at which the cooling unit operates, means readily accessible in normal use for moving the temperature differential, whereby a normal cooling unit temperature range is established, means providing a primary temperature range within which the normal range is contained, and means for modifying the operation of the switch means to obtain a defrosting temperature in the cooling unit and for automatically restoring the operation of the switch means to a condition to maintain the cooling unit temperatures within the normal range at the time when the defrosting operation is substantially completed, said readily accessible adjustable means for moving the temperature differential being capable of all its provided adjustments at all times including the time when the defrosting means is operated to effect defrosting of the cooling unit.

25. In a refrigerating apparatus, a cooling unit, means for circulating a refrigerant through the cooling unit, a device for controlling the operation of the circulating means including switch means, means associated with the switch means for providing an established temperature differential at which the cooling unit operates, means readily accessible in normal use for moving the temperature differential, whereby a normal cooling unit temperature range is established, means providing a primary temperature range within which the normal range is contained, and means for modifying the operation of the switch means to obtain a defrosting temperature in the cooling unit and for automatically restoring the operation of the switch means to a condition to maintain the cooling unit at temperatures within the normal range at the time the defrosting operation is substantially completed, said last means being so arranged that the maximum defrosting temperature remains at substantially a fixed value regardless of the adjustment of the temperature differential.

26. In a refrigerating apparatus, a cabinet, a cooling unit in the cabinet, means for circulating a refrigerant through the cooling unit, a device including switch means for effecting normal operation of the circulating means, means cooperating with said switch means for obtaining a defrosting temperature in the cooling unit and for automatically restoring the circulating means to normal operation when the defrosting operation is substantially completed, and manually operable means so located with respect to the cabinet as to be always readily accessible for interrupting the defrosting operation at any time, and for again effecting normal operation of the circulating means.

27. In a control mechanism for a refrigerating machine having an evaporator, the combination of switch means for starting and stopping the refrigerating machine, means responsive to temperatures for actuating the switch means, means providing for a primary operating temperature range, means for varying the action of the switch means relative to the temperature responsive means so as to obtain various normal refrigerating temperature within the primary range at which frost accumulates on the evaporator, for interrupting the normal action of the switch means so as to obtain a predetermined abnormal temperature in the evaporator and for automatically actuating the switch means to start the refrigerating machine upon the attainment of said predetermined abnormal temperature, said abnormal temperature being sufficiently high to melt frost from the evaporator and sufficiently low to prevent food spoilage, and a readily accessible control means for operating said varying means.

FREDERIC L. TARLETON.